United States Patent [19]
Akita et al.

[11] Patent Number: 5,378,444
[45] Date of Patent: Jan. 3, 1995

[54] PROCESS FOR CLEANING HARMFUL GAS

[75] Inventors: Noboru Akita; Toshiya Hatakeyama; Takashi Shimada; Keiichi Iwata, all of Hiratsuka, Japan

[73] Assignee: Japan Pionics Co., Ltd., Tokyo, Japan

[21] Appl. No.: 975,698

[22] Filed: Nov. 13, 1992

[30] Foreign Application Priority Data

Dec. 11, 1991 [JP] Japan ................. 3-327576
Jun. 26, 1992 [JP] Japan ................. 4-169104

[51] Int. Cl.⁶ .................................................. C01B 7/07
[52] U.S. Cl. ........................... 423/240 S; 423/241
[58] Field of Search ............... 423/240 R, 240 S, 241

[56] References Cited

U.S. PATENT DOCUMENTS

| | | | |
|---|---|---|---|
| 4,594,231 | 6/1986 | Nishino et al. | 423/240 S |
| 4,861,578 | 8/1989 | Fukunaga et al. | 423/240 S |
| 5,030,610 | 7/1991 | Sakata et al. | 423/230 |

FOREIGN PATENT DOCUMENTS

| | | |
|---|---|---|
| 3615027 | 11/1987 | Germany . |
| 02075318 | 3/1990 | Japan . |
| WO8911329 | 11/1989 | WIPO . |

OTHER PUBLICATIONS

Database WPIL Section Ch, Week 8128, Derwent Publications Ltd., London, GB; Class E36, AN 81-51190D & SU-A-774 575 (Budkina) 31 Oct. 1981 (Abstract).
Database WPIL Section Ch, Week 9114, Derwent Publications Ltd., London, GB; Class E36, AN 91-097640 & JP-A-3 040 901 (Nippon Pionics KK) 21, Feb. 1991 (Abstract) & Patent Abstracts of Japan, vol. 015, No. 173 (C-0828), May 2, 1991 (Abstract).
Database WPIL Section Ch, Week 9017, Derwent Publications Ltd., London, GB; Class E36, AN 90-127715 & JP-A-2 075 318 (Nippon Pionics KK) Mar. 15, 1990 (Abstract) & Patent Abstracts of Japan, vol. 014, No. 261 (C-0725), Jun. 6, 1990 (Abstract).

*Primary Examiner*—Benjamin R. Fuller
*Assistant Examiner*—Valerie Ann Lund
*Attorney, Agent, or Firm*—Frishauf, Holtz, Goodman & Woodward

[57] ABSTRACT

There is disclosed a process for cleaning a harmful gas which comprises bringing a harmful gaseous halogenide such as chlorine, hydrogen chloride, dichlorosilane, silicon tetrachloride, phosphorus trichloride, chlorine trifluoride, boron trichloride, boron trifluoride, tungsten hexafluoride, silicon tetrafluoride, fluorine, hydrogen fluoride and hydrogen bromide into contact with a cleaning agent comprising zinc oxide, aluminum oxide and an alkali compound to remove the above halogenide. The above process is extremely effective for promptly and efficiently removing the above gaseous halogenide that is contained in the gas discharged from semiconductor manufacturing process or leaked suddenly from a gas bomb in an emergency.

8 Claims, 1 Drawing Sheet

PROCESS FOR CLEANING HARMFUL GAS

BACKGROUND OF THE INVENTION

1. Field of the Invention

The present invention relates to a process for cleaning a harmful gas. More particularly, it pertains to a process for cleaning a halogenide-based harmful gas such as dichlorosilane, hydrogen chloride, tungsten hexafluoride and chlorine trifluoride that are used in the semiconductor manufacturing industry.

There has been a steady rise in the kinds and usage of gaseous halogenide such as hydrogen chloride, dichlorosilane, chlorine trifluoride and tungsten hexafluoride in recent years as the semiconductor industry and the optoelectronics industry continue to develop. The above-mentioned gases are employed for the formation of crystalline silicon, amorphous silicon or silicon oxide films in the production industries of silicon semiconductors and chemical compound semiconductors and are indispensable substances as etching gases. However, since each of the aforesaid gases exerts a harmful influence on human bodies and the environment on account of their high toxicity, they need to be removed when contained in a gas used in the semiconductor production industry, prior to the discharge in the atmosphere, after being used in the industry.

In addition, hydrolyzable or comparatively less toxic gases such as carbon tetrafluoride, perfluoropropane and sulfur hexafluoride are also employed for the dry etching of silicon films and silicon oxide films in a semiconductor production process, but in the gas discharged through the etching process there is formed a harmful component such as silicon tetrafluoride and fluorine by the reaction between the above-mentioned gases and the film component or by the decomposition of the gases. Such being the case, sufficient care should be taken in discharging a gas from the process.

The aforementioned gases are usually available on the market in the state that the gas is filled in a 0.1 to 47 liters bomb as a pure gas or a diluted gas with nitrogen or the like as exemplified hereunder.

Examples of commercially available gases filled in bombs are as follows:

| Gas (chemical formula) | Bomb capacity (liter) | Concentration (%) | Weight of filled gas (kg) |
|---|---|---|---|
| HCl | 47 | 100 | 25 |
| $SiH_2Cl_2$ | 10 | 100 | 10 |

In order to prevent the atmospheric air from being directly polluted with a gas in case of its leakage from a bomb, the bomb is used in the state that it is connected to a gas supply piping connected to a semiconductor process while it is housed in a bomb accomodation vessel, so called a bomb box that is connected to a ventilation duct. However, even if a bomb is housed in a bomb box, complete prevention of such dangerous accident that is not secured when the bomb is emptied within only about 5 to 10 minutes by a sudden leakage of the gas therefrom. Under such circumstances, there is eagerly desired a complete and thorough countermeasure capable of sufficiently coping with such accident.

2. Description of the Related Art

As the means for removing gaseous halogenide such as hydrogen chloride, dichlorosilane and boron trifluoride that is contained is a process gas, there have heretofore been used two processes, one being a wet process in which the gaseous halogenide is absorbed and decomposed in a scrubber and the other being a dry process wherein the harmful gas is cleaned by being passed through a packed column which is packed with a cleaning agent comprising an alkaline component impregnated into a porous carrier such as activated carbon, a cleaning agent comprising soda lime as the effective ingredient or a like agent.

However, the above-mentioned wet process generally suffers the disadvantages that it finds difficulty in post-treatment and further that it requires a considerable expense in the maintenance of the equipment used therefor.

On the other hand, the aforestated dry process involves such problems that there are not necessarily obtained a sufficient removal rate and a sufficient removal capacity of the harmful gas with a cleaning agent comprising sodium hydroxide, potassium hydroxide or the like impregnated into a porous carrier such as activated carbon or a cleaning agent comprising soda lime and that the dry process fails to promptly cope with a highly concentrated harmful gas and an emergency of sudden or violent leakage of such gas. In addition, a cleaning agent supported on activated carbon sometimes forms inflammable substances with an extremely reactive gas such as fluorine, involving the hazard of fire. On the contrary, soda lime is liable to cause plugging in a cleaning column due to its deliquescent property in combination with the moisture contained in the gas to be treated and to form remarkably deliquescent calcium chloride when used for passing gaseous chloride such as hydrogen chloride and dichlorosilane. As the result, it becomes a problem that the use of soda lime limits the kinds of gases suitable to be treated.

Such being the case, there has long been desired the materilization of a process for cleaning a harmful gas, especially that discharged from semiconductor manufacturing industry. There has also been desired a process being high in treatment rate and treatment capacity for harmful gases, excellent in removal performance, not only in an emergency when a relatively less concentrated, but a large amount of a harmful gas is leaked from a gas bomb because of its abnormality, but also in the ordinary case where a concentrated harmful gas is discharged from a semiconductor manufacturing industry, and free from the possibility of causing a hazard fire in the case of gas cleaning or the plugging in a cleaning column due to deliquesence of a cleaning agent.

In view of the aforestated situation, intensive research and investigation were concentrated by the present inventors on the solution of the above-described problems. As a result it has been found by them that the use of a cleaning agent comprising zinc oxide, aluminum oxide and an alkali compound can remove a harmful gas in various states with extremely high efficiency and utmost safety. The present invention has been accomplished on the basis of the above-mentioned finding and information.

SUMMARY OF THE INVENTION

Specifically, the present invention provides a process for cleaning a harmful gas which comprises bringing a harmful gas containing a gaseous halogenide as the harmful component into contact with a cleaning agent comprising zinc oxide, aluminum oxide and an alkali compound to remove said harmful component.

The process according to the present invention is capable of efficiently removing a halogenide-based harmful gas such as chlorine, hydrogen chloride, dichlorosilane, silicon tetrachloride, phosphorus trichloride, chlorine trifluoride, boron trichloride, boron trifluoride, tungsten hexafluoride, silicon tetrafluoride, fluorine, hydrogen fluoride or hydrogen bromide contained in air, nitrogen, hydrogen or the like. In particular as mentioned hereinbefore, an excellent effect is exerted by the present process, not only on the prompt cleaning of a less concentrated and a large amount of gas (usually air) polluted by a harmful gas that suddenly leaks from a gas bomb but also on the cleaning of a generally concentrated harmful gas at a constant flow rate that is discharged from a semiconductor processing unit, which harmful gas has heretofore been difficult to clean by any of the conventional processes.

DESCRIPTION OF PREFERRED EMBODIMENTS

Figure 1:
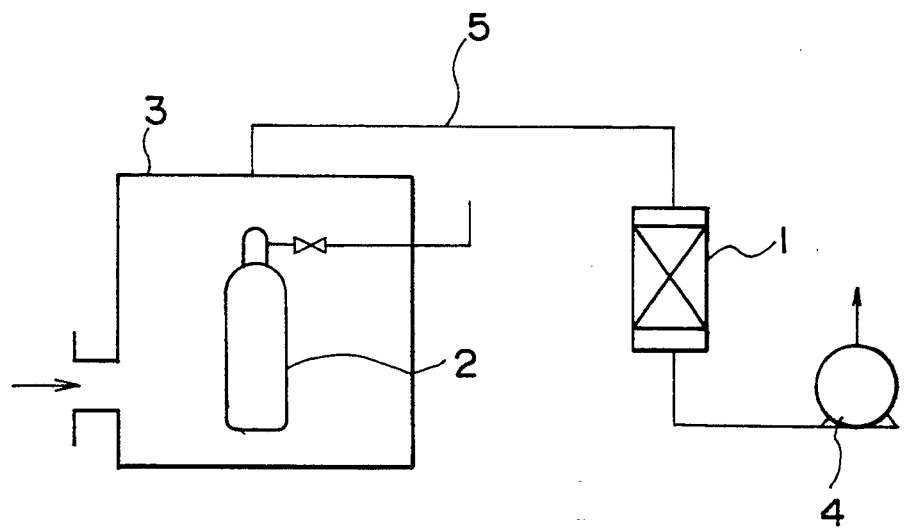
FIG. 1 is a schematic process flow diagram showing the process for cleaning a harmful gas.
Symbols
1: Cleaning column
2: Gas bomb
3: Bomb box
4: Blower
5: Ventilating duct

The cleaning agent to be employed in the process according to the present invention comprises zinc oxide, aluminum oxide and an alkali compound as the principal components.

The zinc oxide can be selected from suitable ones available on the market or from the precursors thereof that are convertible into zinc oxide by means of calcination or the like, said precursors being exemplified by zinc carbonate, basic zinc carbonate, zinc hydroxide and zinc salt from organic acid.

As the aluminum oxide, there is usually used hydrated alumina, and suitable examples include alumina sol available on the market and concentrated alumina produced by powdering the alumina sol.

Examples of the alkali compound include a hydroxide, a carbonate and an acetate each of an alkali metal such as lithium, sodium and potassium; an alkaline earth metal such as magnesium and calcium; or ammonium, of which are preferable potassium carbonate, potassium hydrogencarbonate, potassium hydroxide, sodium carbonate, sodium hydrogencarbonate, sodium hydroxide, ammonium hydroxide and a mixture of at least two thereof.

The ratio of the aluminum oxide to the zinc oxide is usually 0.02 to 0.60, preferably 0.05 to 0.60 expressed in terms of aluminum atom and zinc atom (the number of aluminum atoms per one zinc atom), and the ratio of the alkali compound to the zinc oxide is usually 0.02 to 0.70, preferably 0.05 to 0.50 expressed in terms of alkali metal or ammonium group and zinc atom. In addition, there can be contained a small amount of a metallic component other than zinc such as copper, chromium, iron, nickel or cobalt.

Various methods are available for the preparation of the cleaning agent and exemplified by a method in which water is added to a mixture of zinc oxide or a precursor thereof, alumina sol and an alkali compound with kneading or to a mixture of a precursor thereof and alumina sol to form a cake, and the mixture or cake thus obtained is dried to be used as the cleaning agent as such or made into molding.

In the case where the cleaning agent is packed in a cleaning column to be used for cleaning the harmful gas, it is preferably molded into pellet or the like.

A wide variety of molding methods are available and exemplified by a method wherein the above-obtained mixture or cake is extrusion-molded into a pellet followed by drying the pellet; a method wherein the cake is dried, ground and incorporated with a lubricant such as graphite, and the mixture is molded into a tablet; and a method wherein the cake is granulated by the use of a granulator or the like.

In general, pelletization by means of extrusion molding is conveniently applied in view of the workability and facility in the selection of the shape and size of the molding, and the pellet is desirably rounded at the ends thereof by the use of a rounding machine or the like.

The shape and size of the molding are not specifically limited but are typified by a sphere of 0.5 to 10 mm in diameter, column of 0.5 to 10 mm in diameter and 2 to 20 mm in height, cylinder, etc. There is also used an irregular shape having a screen opening in the range of 0.84 to 5.66 mm, approx. The molding has a density in the range of usually 0.5 to 3.0 g/ml, preferably 0.7 to 2.5 g/ml. By the term "density" as mentioned herein is meant the weight of a molding (granule) divided by the geometrical volume thereof.

The bulk density of the moldings when they are packed in a cleaning column is usually 0.4 to 2.0 g/ml, preferably 0.5 to 1.5 g/ml.

The cleaning agent to be used in the present invention can be used in the form of a mobile bed or a fluidized bed in addition to a fixed bed.

Under ordinary circumstances, the cleaning agent is packed in a cleaning column, and the gas containing a gaseous halogenide is passed therethrough and brought into contact with the cleaning agent so that the gaseous halogenide as the harmful component is removed.

There is no limitation to the concentration and flow velocity of the gaseous halogenide contained in the gas to be treated to which is applied the cleaning process of the present invention, but in general the flow velocity is desirably lowered with increasing concentration. The eliminable concentration of the harmful gas is usually 1% or lower, but can be increased in the case of low flow rate of the gas containing a gaseous halogenide.

The cleaning column is designed in accordance with the concentration of harmful gas, the amount of the gas to be treated, etc. The space linear velocity (LV) is preferably designed at 0.3 to 1.5 m/sec for a relatively low concentration of harmful gas such as 0.1% or lower, 0.05 to 0.3 m/sec for a concentration of 0.1 to 1% approx and 0.05 m/sec or lower for a high concentration such as 1% or higher. The general design criteria specify a LV value of 0.3 to 1.5 m/sec in the case where, for example, the harmful gas is suddenly leaked from a gas bomb and diluted with a large amount of a harmless gas such as air, and a LV value of 0.05 to 0.3 m/sec in the case where, for example, the concentrated harmful gas is discharged from the process in a steady state.

The contact temperature between the cleaning agent and the gas to be treated is ordinarily 0° to 90° C., preferably ordinary temperature (10° to 50° C.) without the need for heating or cooling in particular. The contact temperature after the initiation of startup sometimes rises to some extent on account of reaction heat depending upon the concentration of the harmful gas, but there is no possibility of causing fire since any inflammable substance such as activated carbon is not used in the cleaning process.

The pressure during the contact therebetween is usually atmospheric pressure, but may be reduced pressure or raised pressure such as 1 kg/cm$^2$G.

The humidity of the harmful gas to which is applied the cleaning process of the present invention is not specifically limited, but may be in the dry or wet state of the gas insofar as moisture condensation is not caused. The above-mentioned conditions are free from a fear of causing deliquescence of the cleaning agent or deterioration of performance thereof.

In addition, carbon dioxide gas in the air does not exert adverse influence upon the cleaning agent.

In the case when a sudden leakage of harmful gas is assumed in a bomb box, the process of the present invention is prepared in such a state that, as shown in the flow diagram of FIG. 1, a cleaning column 1 is interposed between a ventilating duct 5 connected to a bomb box 3 that houses a gas bomb 2 and a blower 4 used for continuously suction-ventilating the air in the bomb box 3.

The above-mentioned system is usually equipped with a blower having a capacity sufficient for diluting the harmful gas as low as a concentration of 1% or lower by mixing it with air even if a sudden leakage of the harmful gas should take place. Specifically, there is generally installed a blower having a ventilation capacity of 5 to 200 m$^3$/min, leading to the assumption that the content of the harmful gas in the air becomes about 50 to 1000 ppm when a leakage takes place in such an extent that a commercially available gas bomb as mentioned in the aforestated table is emptied within 5 to 10 minutes.

The height of packing of the cleaning agent in the cleaning column varies depending upon the flow rate of the gas to be cleaned, the concentration of the harmful gas, etc. and thus can not be specified unequivocally, but is usually set to 50 to 500 mm from the practical viewpoint. The inside diameter of the cleaning column is designed so as to attain about 0.3 to 1.5 m/sec space linear velocity (LV) for the gas that is passed through the column. The above-mentioned height and inside diameter are specifically determined taking into consideration the pressure loss through the packed layer, the contact efficiency of the gas with the packing, the concentration of the harmful gas, etc.

The process for cleaning a harmful gas according to the present invention can efficiently and extremely promptly remove a relatively concentrated and a large amount of halogenide-based harmful gases such as hydrogen chloride, dichlorosilane, tungsten hexafluoride and chlorine trifluoride. Accordingly, the above process exerts an excellent effect on the cleaning, not only of a concentrated harmful gas that is discharged from a semiconductor manufacturing process, etc., but also of a large amount of harmful gas that is leaked suddenly from a gas bomb in an emergency.

In the following, the present invention will be described in more detail with reference to the non-limitative examples.

EXAMPLES 1 to 13

Basic zinc carbonate in an amount of 500 g, 52.4 g of concentrated alumina (produced by Catalysts & Chemicals Industries Co., Ltd. under the tradename "Cataloid AP"), that is, Al/Zn atomic ratio being 0.16 and 30.2 g of potassium carbonate anhydride, that is, the K/Zn atomic ratio being 0.10 were placed in a small-sized kneader, mixed for 3 minutes and kneaded with 280 g of water added thereto for one hour. The resultant cake was extruded through a nozzle plate with 1.9 mm diameter nozzle attached to a small-sized extruder. The pellet thus obtained was rounded with a rounding machine and dried at 110° C. for 2 hours, and the rounded dried pellet was placed in a muffle furnace and calcined at 350° C. for one hour to obtain a cleaning agent having 1.14 g/ml density.

By the use of the above-obtained cleaning agent, cleaning experiments were carried out for relatively less concentrated but large amounts of harmful gases based on the assumption that the harmful gases suddenly leaked from a bomb. In this experiment, 28.4 ml of the cleaning agent was packed in a cleaning column made of quartz glass having 19 mm inside diameter and 2000 mm length at a bulk density of 0.98 g/ml. Then, various gaseous halogenides each contained in nitrogen in 1000 ppm were each passed through the column at a total flow rate of 10.22 L/min, that is, space linear velocity of LV=60 cm/sec at 20° C. under atmospheric pressure. The break through point in the experiment was detected by sampling the gas at the outlet of the column and analyzing the sample thus collected by means of a gas-detecting tube for chloride or fluoride (produced by Gastech Coporation). The results are given in Table 1.

TABLE 1

| Example | Kind of harmful gas | Concentration of harmful gas (ppm) | Space linear velocity LV (cm/sec) | Effective treatment time (Break through time) (min) |
| --- | --- | --- | --- | --- |
| 1 | Hydrogen chloride | 1000 | 60 | 112 |
| 2 | Dichlorosilane | 1000 | 60 | 45 |
| 3 | Boron trichloride | 1000 | 60 | 20 |
| 4 | Silicon tetrachloride | 1000 | 60 | 26 |
| 5 | Chlorine | 1000 | 60 | 42 |
| 6 | Silicon tetrafluoride | 1000 | 60 | 23 |
| 7 | Phosphorus trichloride | 1000 | 60 | 23 |
| 8 | Fluorine | 1000 | 60 | 97 |
| 9 | Chlorine trifluoride | 1000 | 60 | 49 |
| 10 | Tungsten hexafluoride | 1000 | 60 | 23 |
| 11 | Hydrogen bromide | 1000 | 60 | 83 |
| 12 | Hydrogen fluoride | 1000 | 60 | 40 |
| 13 | Boron trifluoride | 1000 | 60 | 25 |

EXAMPLES 14 to 26

Cleaning experiments were carried out for concentrated harmful gases each at a constant flow rate based on the assumption that the harmful gases were discharged from a semiconductor process.

Various gaseous halogenides each contained in nitrogen in 1 vol % were each passed through the same cleaning column that was used in Examples 1 to 13 at a total flow rate of 850 ml/min, that is, a space linear velocity of LV=1 cm/sec at 20° C. under atmospheric pressure. The break through point in the experiment was detected and the break through time was measured in the same manner as in Examples 1 to 13. The results are given in Table 2.

TABLE 2

| Example | Kind of harmful gas | Concentration of harmful gas (%) | Space linear velocity LV (cm/sec) | Effective treatment time (Break through time) (min) |
|---|---|---|---|---|
| 14 | Hydrogen chloride | 1 | 5 | 241 |
| 15 | Dichlorosilane | 1 | 5 | 80 |
| 16 | Boron trichloride | 1 | 5 | 52 |
| 17 | Silicon tetrachloride | 1 | 5 | 55 |
| 18 | Chlorine | 1 | 5 | 25 |
| 19 | Silicon tetrafluoride | 1 | 5 | 33 |
| 20 | Phosphorus trichloride | 1 | 5 | 52 |
| 21 | Fluorine | 1 | 5 | 156 |
| 22 | Chlorine trifluoride | 1 | 5 | 37 |
| 23 | Tungsten hexafluoride | 1 | 5 | 64 |
| 24 | Hydrogen bromide | 1 | 5 | 196 |
| 25 | Hydrogen fluoride | 1 | 5 | 89 |
| 26 | Boron trifluoride | 1 | 5 | 80 |

Comparative Examples 1 to 8

Two types of cleaning agents were prepared, one by impregnating activated carbon as the carrier with sodium hydroxide in an amount of 40% by weight and drying the agent at 120° C. to a moisture content of 10% by weight to be used in comparative Examples 1 to 4, and the other by impregnating activated carbon as the carrier with potassium hydroxide in an amount of 50% by weight and drying the agent in the same manner to be used in Comparative Examples 5 to 8. By the use of the above-prepared cleaning agents, cleaning experiments were conducted for the harmful gases containing hydrogen chloride and dichlorosilane, respectively in the same manner as in the above examples. The results are given in Table 3.

TABLE 3

| Comparative Example | Kind of harmful gas | Concentration of harmful gas | Space linear velocity LV (cm/sec) | Effective treatment time (Break through time) (min) |
|---|---|---|---|---|
| 1 | Hydrogen chloride | 1% | 5 | |
| 2 | Dichlorosilane | 1% | 5 | |
| 3 | Hydrogen chloride | 500 ppm | 60 | 12 |
| 4 | Dichlorosilane | 500 ppm | 60 | 8 |
| 5 | Hydrogen chloride | 1% | 5 | |
| 6 | Dichlorosilane | 1% | 5 | |
| 7 | Hydrogen chloride | 500 ppm | 60 | 18 |
| 8 | Dichlorosilane | 500 ppm | 60 | 12 |

What is claimed is:

1. A process for cleaning a harmful gas which comprises a step of: contacting a harmful gas containing a gaseous halogenide as a harmful component with a cleaning agent comprising (i) zinc oxide, (ii) aluminum oxide and (iii) at least one compound selected from the group consisting of potassium carbonate, potassium hydrogencarbonate, potassium hydroxide, sodium carbonate, sodium hydrogencarbonate, sodium hydroxide and ammonium hydroxide, to remove said harmful gas; the gaseous halogenide being at least one member selected from the group consisting of chlorine, hydrogen chloride, dichlorosilane, silicon tetrachloride, phosphorus trichloride, chlorine trifluoride, boron trichloride, boron trifluoride, tungsten hexafluoride, silicon tetrafluoride, fluorine, hydrogen fluoride and hydrogen bromide; a ratio of the aluminum oxide to the zinc oxide being 0.05 to 0.60 expressed in terms of a number of aluminum atoms per one zinc atom and a ratio of the compound (iii) to the zinc oxide being 0.05 to 0.50 expressed in terms of a number of potassium atoms, or sodium atoms or ammonium groups per one zinc oxide; the gaseous halogenide having a concentration of 50 to 1,000 ppm by volume; and the aluminum oxide being hydrated alumina.

2. The process according to claim 1 wherein the harmful gas is discharged from a semiconductor process.

3. The process according to claim 2 wherein the harmful gas is leaked from a bomb containing said gaseous halogenide and air which dilutes said gaseous halogenide.

4. The process according to claim 1 wherein the process is carried out at a space linear velocity of 0.3 to 1.5 m/second.

5. The process according to claim 1 wherein the process is carried out at a space linear velocity of 0.05 to 0.3 m/second.

6. The process according to claim 1 wherein the process is carried out at a temperature of 0° to 90° C.

7. The process according to claim 1 wherein the process is carried out at a temperature of 10° to 50° C.

8. A process for cleaning a harmful gas which comprises a step of a: contacting a harmful gas containing a gaseous halogenide as a harmful component with a cleaning agent comprising (i) zinc oxide, (ii) aluminum oxide and (iii) at least one compound selected from the group consisting of potassium carbonate, potassium hydrogencarbonate, potassium hydroxide, sodium carbonate, sodium hydrogencarbonate, sodium hydroxide and ammonium hydroxide, to remove said harmful gas; the gaseous halogenide being at least one member selected from the group consisting of chlorine, hydrogen chloride, dichlorosilane, silicon tetrachloride, phosphorus trichloride, chlorine trifluoride, boron trichloride, boron trifluoride, tungsten hexafluoride, silicon tetrafluoride, fluorine, hydrogen fluoride and hydrogen bromide; a ratio of the aluminum oxide to the zinc oxide being 0.02 to 0.60 expressed in terms of a number of aluminum atoms per one zinc atom and a ratio of the compound (iii) to the zinc oxide is 0.02 to 0.70 expressed in terms of a number of potassium atoms, sodium atoms or ammonium groups per one zinc oxide; the gaseous halogenide having a concentration of 50 to 1,000 ppm by volume; and the aluminum oxide being hydrated alumina.

* * * * *